March 30, 1965 T. G. GRANRYD 3,175,711
TRACTOR LOADERS

Filed Jan. 22, 1962 5 Sheets-Sheet 1

INVENTOR.
Thorvald G. Granryd
BY Paul O. Pippel
Atty.

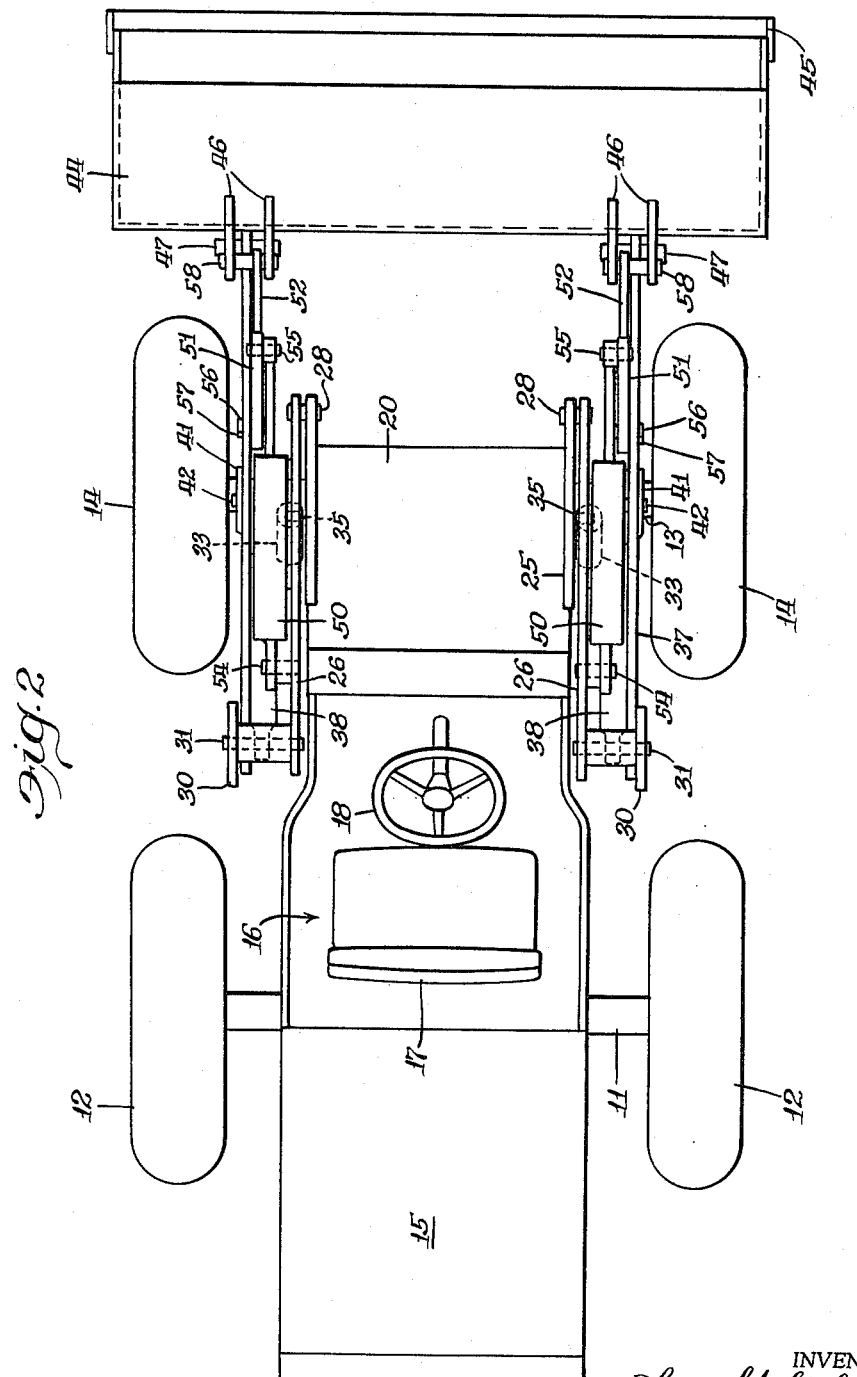

March 30, 1965 T. G. GRANRYD 3,175,711
TRACTOR LOADERS
Filed Jan. 22, 1962 5 Sheets-Sheet 3
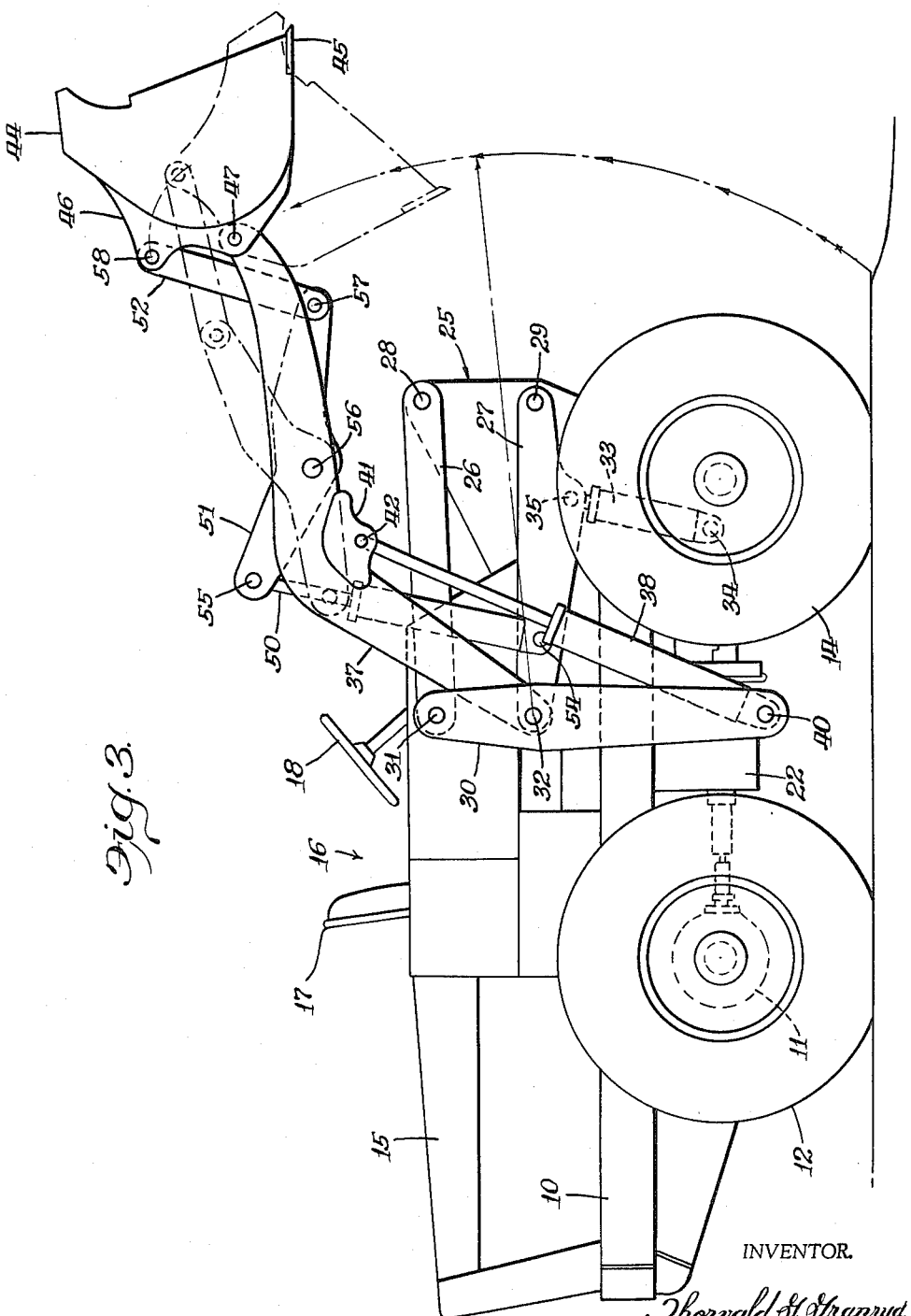
INVENTOR.
Thorvald G. Granryd
Paul O. Pippel
Atty.

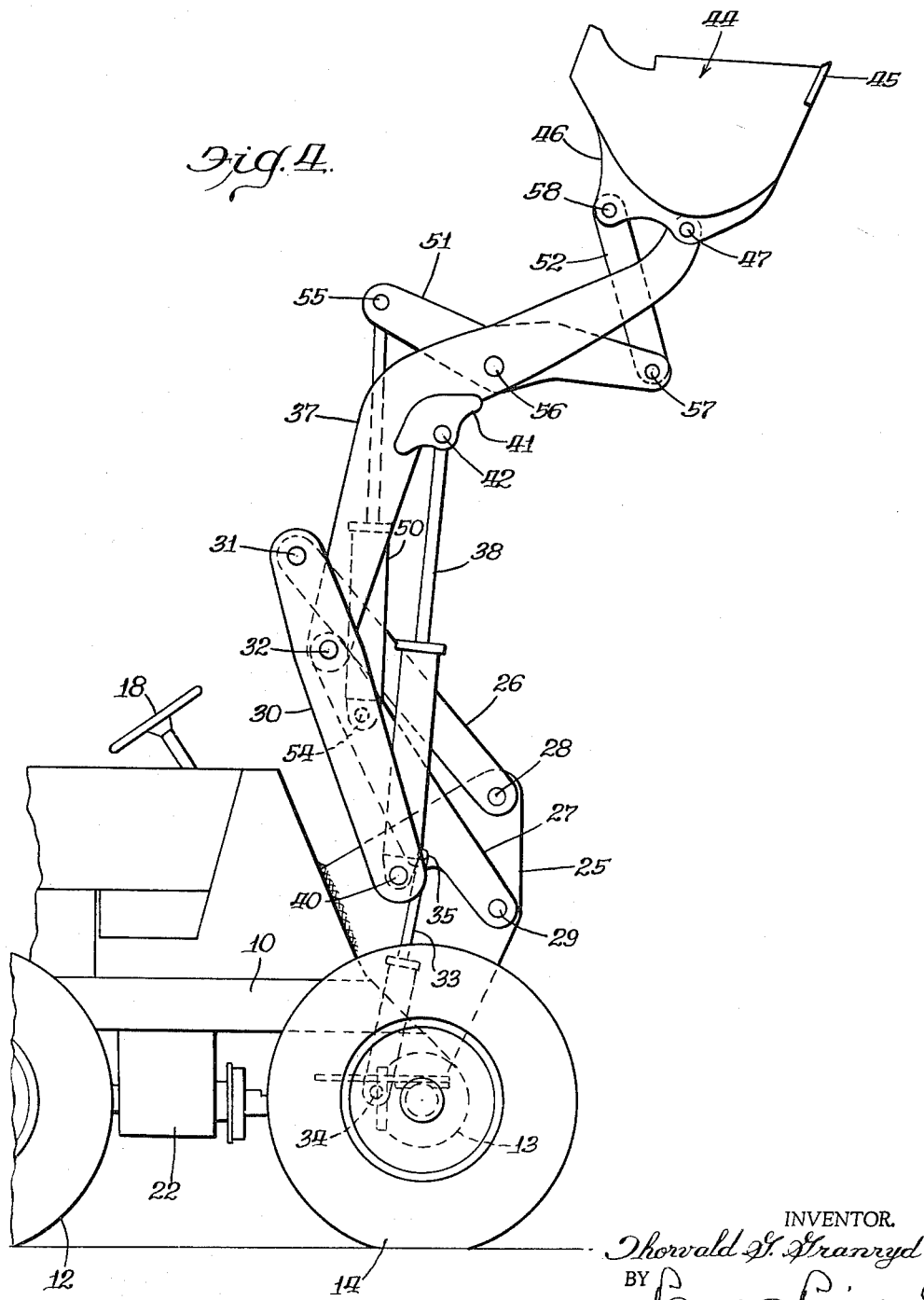

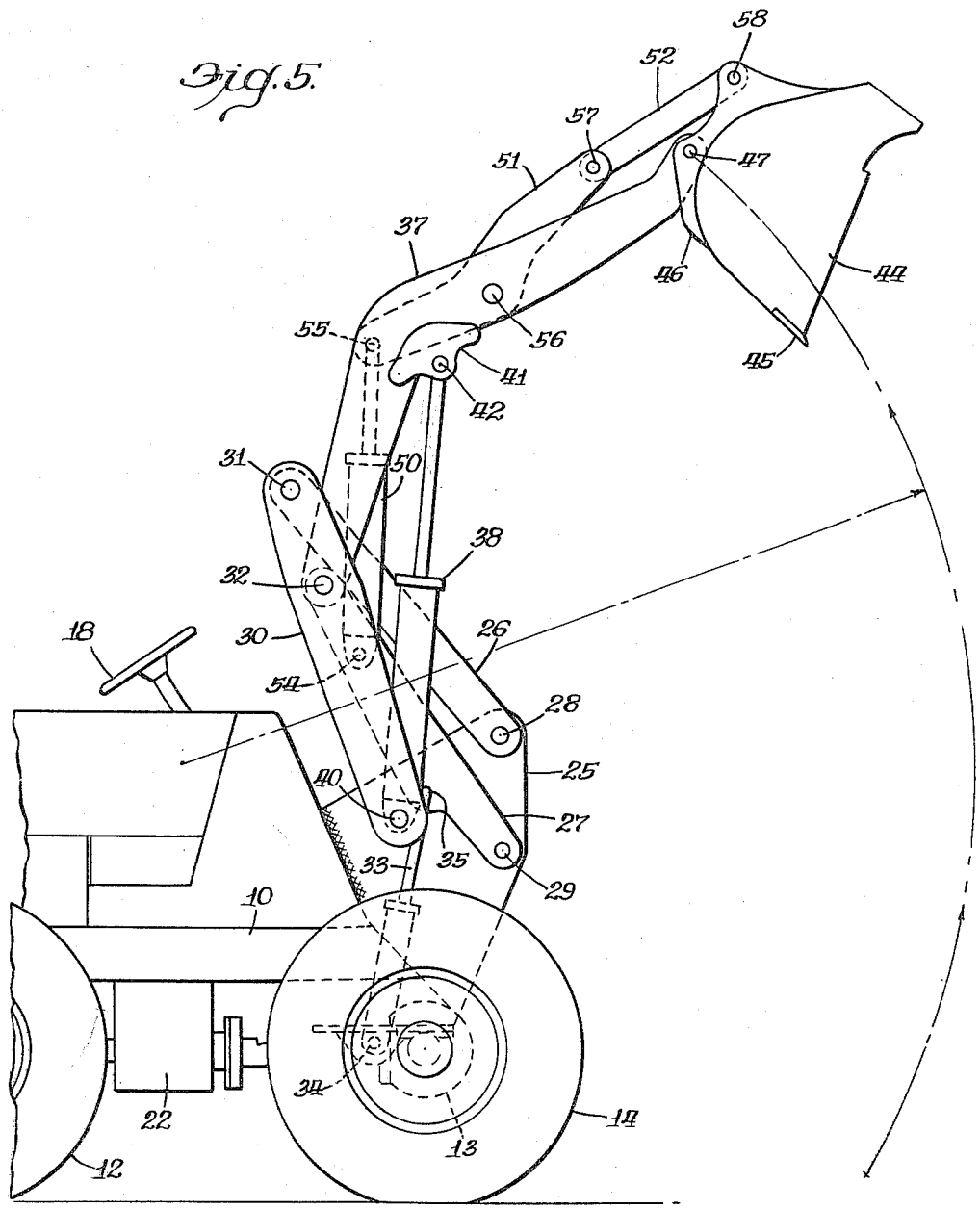

United States Patent Office 3,175,711
Patented Mar. 30, 1965

3,175,711
TRACTOR LOADERS
Thorvald G. Granryd, Libertyville, Ill., assignor to The Frank G. Hough Co., a corporation of Illinois
Filed Jan. 22, 1962, Ser. No. 167,770
8 Claims. (Cl. 214—140)

This invention relates generally to tractor loaders, and more particularly to front-end type tractor loaders having arrangements providing a high lifting range for the dumping of the bucket.

The primary object of the invention is to provide a novel arrangement for a front-end type tractor loader wherein the loader is adapted to dump the bucket through a high lifting range thereof.

It is a further object to provide a front-end type tractor loader with a normal lifting range for the bucket and additionally including novel means substantially increasing the lifting range of the bucket.

It is a further object to provide a front-end type tractor loader with a loader arrangement which provides a digging arrangement wherein the bucket is carried close to the forward end of the tractor, and further including two cooperating bucket lifting arrangements providing a normal lifting range for the bucket and a substantially increased lifting range for the bucket.

It is another object to include novel means in a tractor loader such as described in the immediately preceding paragraph, which will permit the bucket to be raised through a large lifting range with a relatively small amount of horizontal movement of the bucket throughout the lifting range of the bucket.

It is still another object of the present invention to provide novel means in a front-end type tractor loader constructed according to any of the preceding paragraphs for automatically maintaining the bucket in substantially one pivoted position relative to the ground as the bucket is raised through the entire lifting ranges thereof.

It is still another object of the present invention to provide a novel front-end type loader arrangement for a tractor wherein the loader is connected substantially to the extreme forward end of the tractor with major portions of the loader extending rearwardly from the forward end of the tractor and on each side thereof to provide a compact tractor loader arrangement wherein digging may be accomplished with the bucket carried close to the forward end of the tractor and wherein the bucket may be raised through a large lifting range with a minimum of horizontal movement of the bucket relative to the vertical movement thereof as the bucket is raised throughout the lifting range thereof.

Other objects and features of the invention will be apparent upon a perusal of the following specification and drawings in which:

FIGURE 2 is a top plan view of the structure shown in FIGURE 1;

FIGURE 3 is a view similar to FIGURE 1 but with the bucket raised through the first range of lifting thereof;

FIGURE 4 is a partial view similar to FIGURE 1 but showing the bucket raised to its maximum height position; and FIGURE 5 is a view similar to FIGURE 4 but with the bucket pivoted to the dump position.

Figure 1:
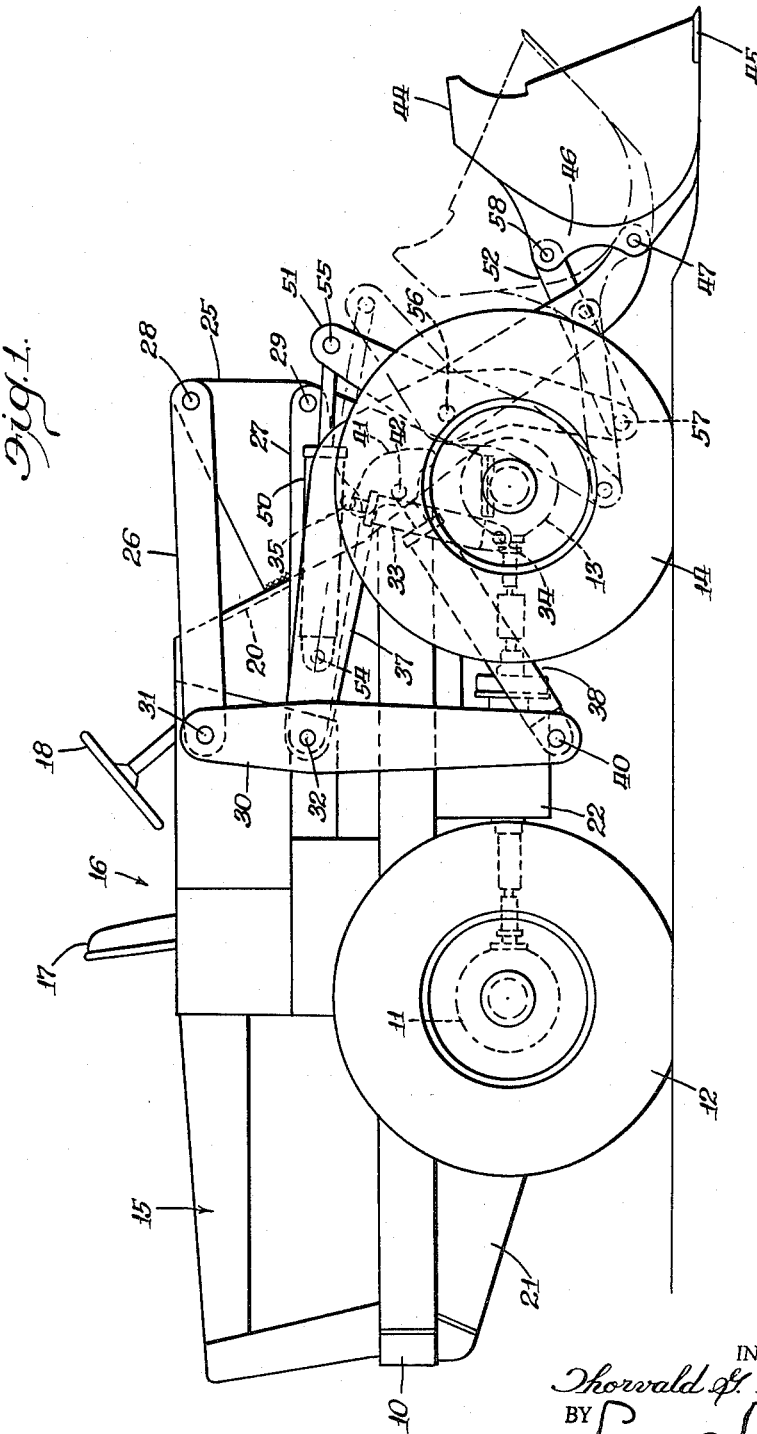
FIGURE 1 is a side elevational view of a tractor loader constructed according to the present invention.

The present embodiment is the preferred embodiment, but it is to be understood that changes can be made in the present embodiment by one skilled in the art without departing from the spirit and scope of the present invention.

Generally, the present invention comprises a front-end type tractor loader wherein the tractor is of the four wheel rubber tired type with the engine compartment of the tractor disposed at the rearward end thereof. The present invention is also readily adaptable to a crawler type tractor. At the extreme forward end of the tractor, a pair of upstanding plates are provided for carrying the loader structure. To the forward vertical edge of each of those plates, a pair of levers are pivotally connected in a vertically spaced relationship. Each pair of levers is disposed to extend generally toward the rear of the tractor. An arm is pivotally connected to the other end of the lever of each pair of levers. Each of the arms has a depending portion which extends substantially downwardly. Each pair of levers is pivotable to raise and lower the associated arm by a hydraulic ram which is pivotally connected between the axle housing of the forward wheels of the tractor and the lower lever of each pair of levers intermediate the ends thereof. When those hydraulic rams are completely retracted, each pair of levers and each arm are positioned substantially as shown in FIGURES 1 and 3, and when those hydraulic rams are substantially completely extended, each pair of levers and each arm are positioned substantially as shown in FIGURES 4 and 5.

Two boom arms are also provided and each boom arm is pivotally connected at one end thereof to one of the arms carried by each pair of levers. The specific location of the pivot axis of each boom arm is intermediate the ends of the vertical arm and in the present embodiment also substantially coincident with the axis of pivoting of the lower lever of each pair of levers to the associated vertical arm. Each boom arm extends generally forwardly of the tractor and a digging bucket is pivotally connected to the forward ends of the boom arm. The forward ends of the boom arms are raised and lowered by a pair of boom rams. Each of the boom rams is pivotally connected between the lower end of one of the vertical arms and one of the boom arms intermediate the ends thereof. When the boom rams are completely retracted, the boom arms are positioned such as shown in FIGURE 1, and when the boom rams are substantially completely extended, the boom arms are positioned such as shown in FIGURES 3, 4 and 5.

The pivotal position of the bucket relative to ground level and relative to the boom is determined by certain linkage means disposed on each side of the tractor. Each linkage means comprises a bucket-tilting hydraulic ram, a lever and a link. One end of each bucket-tilting hydraulic ram is pivotally connected to the lower one of one of the pairs of levers intermediate the ends thereof. The pairs of levers and each associated boom arm are spaced apart a distance sufficient to permit the carrying of the bucket-tilting ram therebetween as may be seen in FIGURE 2. The other end of each bucket-tilting ram is pivotally connected to one end of the lever of each linkage means. The lever of each linkage means is pivotally connected intermediate its ends on the inner side of one of the boom arms. The other end of each lever of each linkage means depends in a generally downward direction, and each link of each linkage means is pivotally connected at one end thereof to the lower depending end of the associated linkage means lever. The other end of each link is pivotally connected to the bucket. When the bucket-tilting rams are short of completely extended, the bucket will assume a pivotal position such as shown by the solid lines in FIGURES 1 and 3. If the bucket tilting rams are substantially completely extended the bucket will be pivoted rearwardly to what is commonly called the break-out position. The break-out position of the bucket is shown by the dotted lines in FIGURE 1. If the bucket-tilting rams are substantially completely retracted, the bucket is tilted or pivoted to the dump position such as shown by the dotted lines in FIGURE 3 and the solid line position shown in FIGURE 5.

The operation of the loader in digging and in carrying and dumping a load within the normal lifting range is shown in FIGURES 1 and 3 and is conditioned upon the substantially complete retraction of the pair of hydraulic rams which pivot the pairs of levers connected to the forward end of the tractor. In FIGURE 1 it may be seen that in the ground level digging position, the bucket is carried quite close to the forward end of the tractor providing a stable digging and bucket filling arrangement. By completely extending the bucket tilting rams, the bucket may be pivoted rearwardly to the break-out position wherein the bucket is carried with the open side disposed upwardly and immediately forwardly of the forward wheels of the tractor. The boom rams may then be partially extended to raise the boom to position the bucket in a convenient carrying position for transporting of the loaded bucket to a remote position for dumping thereof. For normal height dumping of the bucket, the boom rams are then completely extended to a position such as shown in FIGURE 3. The position of the bucket in FIGURE 3 which would correspond to the dotted line or break-out position shown in FIGURE 1 is not shown in FIGURE 3 to avoid unnecessarily complicating the drawing. However, when the boom is raised with the bucket in the break-out position, the bucket will be automatically tilted rearwardly relative to the boom to maintain the open side of the bucket substantially level or parallel to ground level as the boom is raised due to the modified parallelogram defined by the pivot axes of the boom, the bucket tilting rams and the bucket on the boom and to the links of the linkage means. If the bucket tilting rams are then completely retracted, the bucket will be dumped to the dotted line position shown in FIGURE 3. Thus it may be seen that digging, carrying and dumping of the bucket may be accomplished within one working range of the loader merely by suitable extensions and retractions of the boom rams and the bucket tilting rams.

At any time that the operator of the tractor loader desires to dump the bucket at a substantially increased elevation, the hydraulic rams connected to the pair of levers on each side of the tractor are completely extended to a position such as shown in FIGURES 4 and 5. The extension of those hydraulic rams will cause the rearward ends of each pair of levers and the arms connected thereto to be carried substantially vertically. The arms in moving vertically will carry the boom arms, the boom rams and the linkage means to a raised position such as shown in FIGURE 4. Substantially complete retraction of the bucket tilting rams will then cause the bucket to be dumped from the position shown in FIGURE 4 to that shown in FIGURE 5. By a comparison of the drawings it may be seen that in achieving the relatively great dumping height of FIGURE 5, the bucket is maintained substantially close to the forward end of the tractor as it is raised. Thus the bucket is not swept in a wide arc having a large horizontal component of movement.

Although the operation of the invention has been above described in two distinct phases, this has been merely done to clarify the construction of the invention. Any desired combined operation of the three pairs of hydraulic rams may be selected by the operator of the tractor loader to produce many different patterns of movement of the bucket in the working, carrying and dumping of any load.

In detail, the tractor of the present embodiment comprises a frame 10 supported at the rearward end thereof on the rearward axle assembly 11 and the rear wheels 12, and at the forward end thereof on the forward axle assembly 13 and the forward wheels 14. An engine compartment 15 is carried on the rearward portion of the frame 10. An operator's compartment 16 is disposed on the frame 10 forwardly of the engine compartment 15. The operator's compartment 16 comprises a seat 17 and a steering wheel 18. The forward end of the tractor is defined by an inclined plate 20. The drawings of the tractor of the present embodiment further discloses a counterweight 21 carried to depend from the rearward end of the frame 10, and a transmission or transfer drive case 22 for connecting a power train to the forward and rearward axle assemblies 13 and 11.

The loader structure of the present invention is carried on a pair of plates 25 which in turn is secured to the inclined plate 20 at the forward end of the tractor. Each of the plates 25 is secured at one side marginal edge of the plate 20 to upstand therefrom. Since the portions of the loader structure connected to each of the plates 25, exclusive of the bucket, are identically constructed, only the portion of the loader structure connected to one of the plates 25 and to the bucket need be described in detail. A pair of levers 26 and 27 are each pivotally connected at one end thereof to the plate 25. The lever 26 is pivotally connected by a pin 28 to the upper forward marginal edge portion of the plate 25. The lever 27 is pivotally connected by a pin 29 to the forward marginal edge portion of the plate 25 at a position vertically spaced below the pin 28. The other end of each of the levers 26 and 27 extends in a generally rearward direction along the side of the tractor. An arm 30 is pivotally connected to the other end of each of the levers 26 and 27. One end of the arm 30 is pivotally connected to the rearward end of lever 26 by pin means 31. The rearward end of the lever 27 is pivotally connected to the arm 30 by a pin 32 at a position on the arm 30 which is spaced from the pin 31 a distance slightly less than the distance between the pins 28 and 29. The remaining major portion of the arm 30 extends substantially downwardly.

The pivoted position of the arrangement of the levers 26 and 27 and the arm 30 is determined by a hydraulic ram 33. The head end of the hydraulic ram 33 is pivotally connected, as at 34, to the forward axle housing 13. The other end of the hydraulic ram 33 is pivotally connected by pin means 35 to the lever 27 intermediate the ends thereof. When the hydraulic ram 33 is substantially completely retracted, the levers 26 and 27 extend in a generally horizontal direction toward the rear of the tractor and the arm 30 is substantially vertically disposed, as in FIGURES 1 and 3. If the hydraulic ram 33 is extended, the lever 27 is pivoted in a clockwise direction as viewed in FIGURE 1. The lever 27 in pivoting will carry the arm 30 and the lever 26 therewith in an upward and forward direction, and in the completely extended position of the hydraulic ram 33, the levers 26 and 27 and the arm 30 will be positioned substantially as shown in FIGURES 4 and 5.

The boom 37 is pivotally connected at one end thereof to the arm 30 intermediate the ends thereof by pin means 32. Thus it may be seen that the rearward ends of the lever 27 and the boom 37 are both pivotally connected to the arm 30 by the pin 32. The pin 32 carries the boom 37 between the arm 30 and the lever 27, and in a spaced apart relationship to the lever 27. The other end of the boom extends forwardly of the tractor. The pivoted position of the boom 37 relative to the arm 30 is determined by a hydraulic ram 38. The head end of the hydraulic ram 38 is pivotally connected to the lower end of the arm 30 by pin means 40. The rod end of the hydraulic ram 38 is pivotally connected to a bracket 41 by a pin 42. The bracket 41 is secured to the boom 37 intermediate the ends thereof by any suitable means such as welding. When the hydraulic rams 33 and 38 are substantially completely retracted, the forward end of the boom 37 is positioned in its lowermost position adjacent ground level. When the hydraulic ram 38 is substantially extended, the forward end of the boom is pivoted upwardly to a position substantially as shown in FIGURE 3.

The bucket 44 of the loader of the present invention may be of any suitable type of digging bucket known in the art. The forward marginal edge of the bottom wall of the bucket 44 is provided with a cutting edge 45. The rearward wall of the bucket 44 is provided with two pairs of flanges 46 secured to the rearward wall of the bucket 44 in a transversely spaced apart relationship to each other substantially as shown in FIGURE 2. The forward end of each boom 37 is pivotally connected between one pair of flanges 46 by a pin 47.

The linkage means for controlling the pivotal position of the bucket 44 relative to the boom 37 comprises a hydraulic ram 50, a lever 51 and a link 52. The head end of the hydraulic ram 50 is pivotally connected to the lever 27 intermediate the ends thereof by pin means 54. The spacing between the lever 27 and the boom 37 is sufficient to admit the cylinder portion of the hydraulic ram 50 therebetween. Pin means 54 is positioned on the arm 27 between the pins 32 and 35. The rod end of the hydraulic ram 50 is pivotally connected to one end of the lever 51 by a pin 55. The lever 51 is pivotally mounted intermediate the ends thereof on the boom 37 intermediate the ends thereof by a pin 56. The lever 51 is carried on the inner side of the boom 37 between pins 42 and 47. The other or lower end of the lever 51 is pivotally connected to one end of the link 52 by a pin 57. The other end of the link 52 is pivotally connected by a pin 58 between the flanges 46 of the bucket 44. Pin 58 is positioned through the flanges 46 a distance above the pin 47 which is substantially equal to the distance between the pin 32 and the pin means 54. The hydraulic ram 50 has a stroke relative to the lengths and positions of the lever 51 and the link 52 such that when the hydraulic ram 50 is short of being completely extended, and when the boom 37 is in its lowermost position, the bucket 44 is positioned in the ground level digging position such as shown in FIGURE 1. The linkage means of the hydraulic ram 50, the lever 51 and the link 52 is further so formed that when the hydraulic ram 50 is completely extended, the bucket 44 is pivoted rearwardly to the break-out position shown by the dotted lines in FIGURE 1. When the hydraulic ram 50 is completely retracted, the bucket 44 is pivoted to the dump position such as shown in FIGURE 5 and by the dotted lines in FIGURE 3.

From the foregoing it may be seen that when the hydraulic rams 33 are completely retracted, the boom rams 38 and the bucket tilting rams 50 may be operated to produce various digging, carrying and dumping positions of the bucket 44 within the lifting range of the boom shown in FIGURE 3. When the rams 33 are completely extended, the boom 37, the linkage means and the bucket 44 are carried substantially upwardly by the levers 26 and 27 and the arm 30 to positions such as shown in FIGURES 4 and 5. In the high lift position of the boom 37, dumping of the bucket 44 into relatively high bins or truck bodies is easily achieved. It should be noted that in the raising of the boom 37 by the levers 26 and 27 and the arm 30, the levers 26 and 27 are pivoted in a clockwise direction as viewed in the drawings, and when the boom 37 is raised relative to the levers 26 and 27 and the arm 30, the boom is pivoted in a counterclockwise direction as viewed in the drawings. This feature provides for a minimum of horizontal movement of the bucket 44 relative to the vertical height achieved when the bucket 44 is raised to the maximum position. This feature is important in that digging and carrying may be accomplished with the bucket positioned relatively close to the forward end of the tractor, a position which provides for maximum stability of the entire tractor loader arrangement. Further, because of the relatively small horizontal component of movement of the bucket as the bucket is raised to the high-lift position, the bucket 44 is never disposed so far forwardly of the tractor that a heavy load in the bucket would render the tractor loader arrangement unstable. The stability of the arrangement is inherent in all positions of the bucket.

Having described the invention what is considered new and desired to be protected by Letters Patent is:

1. In a tractor loader, a lever assembly pivotally carried at one end thereof on the forward end of the tractor and extending generally rearwardly thereof, first hydraulic ram means connected between the tractor and said lever assembly for pivoting said lever assembly upwardly and forwardly from its rearwardly extending position to an upwardly extending position, a boom pivotally connected to the rearward end of said lever assembly and extending forwardly of the tractor, second hydraulic ram means connected between said lever assembly and said boom for pivoting said boom relative to said lever assembly from a downwardly extending position to an upwardly extending position, a bucket pivotally carried on the forward end of said boom, and means for pivoting said bucket relative to said boom.

2. In a tractor loader as defined in claim 1, wherein the head end of said first hydraulic ram means is pivotally connected to the forward axle assembly of the tractor and the rod end of said first hydraulic ram means is pivotally connected to said lever assembly intermediate the ends thereof at a position substantially vertically above the forward axle assembly.

3. In a tractor loader, a lever assembly pivotally carried at one end thereof on the forward end of the tractor and extending generally rearwardly thereof, a hydraulic ram pivotally connected between said tractor and said lever assembly intermediate the ends thereof for pivoting the rearward end of said lever assembly upwardly and forwardly from a rearwardly extending position to an upwardly extending position, a boom having one end thereof pivotally connected to said rearward end of said lever assembly, the other end of said boom extending forwardly of said tractor, a second hydraulic ram, means pivotally connecting one end of said second hydraulic ram to said lever assembly at a position spaced vertically below the pivotal connection of said boom to said lever assembly, means pivotally connecting the other end of said second hydraulic ram to said boom intermediate the ends thereof, said second hydraulic ram operable to pivot said boom relative to said lever assembly, a bucket pivotally carried on the forward end of said boom, and means for pivoting said bucket relative to said boom.

4. In a tractor loader, a pair of plates rigidly secured to the forward end of said tractor on each side thereof, said plates extending upwardly and forwardly of said tractor, a pair of lever assemblies, each of said lever assemblies pivotally carried on one of said plates at the forward marginal edge portion thereof and extending generally rearwardly thereof on one side of said tractor, means for pivoting the rearward end of each of said lever assemblies upwardly and forwardly to an upwardly extending position above the forward end of said tractor, a pair of booms, each of said booms pivotally connected at one end thereof to one of said lever assemblies at said rearward end thereof, the other end of each of said booms extending forwardly of said tractor, a pair of hydraulic rams, each of said hydraulic rams pivotally connected at one end thereof to one of said lever assemblies at a position spaced vertically below the pivotal connection of said booms to said lever assemblies, means pivotally connecting the other end of each of said hydraulic rams to one of said booms intermediate the ends thereof for pivoting said booms relative to said lever assembly, a bucket pivotally connected to the forward end of said booms, and means for pivoting said bucket relative to said booms.

5. In a tractor leader, a pair of plates rigidly secured to the forward end of said tractor on each side thereof, said plates extending upwardly and forwardly of said tractor, a pair of lever assemblies, each of said lever assemblies pivotally carried on one of said plates at the forward marginal edge portion thereof and extending generally rearwardly thereof on one side of said tractor, a pair of hydraulic rams, each of said hydraulic rams pivotally connected between said tractor and one of said lever assemblies intermediate the ends thereof for pivoting said lever assemblies upwardly and forwardly to an upwardly extending position above the forward end of said tractor, a pair of booms, each of said booms pivotally connected at one end thereof to one of said lever assemblies at said rearward end thereof, the other end of each of said booms extending forwardly of said tractor, a pair of second hydraulic rams, each of said second hydraulic rams pivotally connected between one of said booms intermediate the ends thereof and one of said lever assemblies at a position spaced vertically below the pivotal connection of the boom to the lever assembly for pivoting each of said booms relative to said lever assemblies, a bucket pivotally connected to the forward end of said booms, and a pair of linkage means, each of said linkage means pivotally connected at one end thereof to one of said lever assemblies and at the other end thereof to said bucket, each of said linkage means including a third hydraulic ram operable to pivot said bucket relative to said boom.

6. In a tractor loader, a lever assembly comprising an arm connected to one end of said lever assembly, the other end of said lever assembly pivotally carried on the forward end of the tractor, a hydraulic ram pivotally connected between said tractor and said lever assembly intermediate the ends thereof for pivoting said lever assembly to move said arm from a position on the side of and intermediate the ends of said tractor to a position above the forward end of said tractor, a boom having one end thereof pivotally connected to said arm, the other end of said boom extending forwardly of said tractor, means connected between said boom intermediate the ends thereof and said arm at a position spaced from the connection of said arm to said lever assembly for pivoting said boom from a downwardly extending position to an upwardly extending position, a bucket pivotally carried on the forward end of said boom, and means for pivoting said bucket relative to said boom.

7. In a tractor loader, a lever assembly comprising a pair of levers and an arm, one end of one of said levers pivotally connected to the forward end of said tractor and extending generally rearwardly thereof, means pivotally connecting one end of said arm to the other end of said one lever, the other of said levers pivotally connected at one end thereof to the forward end of said tractor at a position spaced below the pivotal connection of said one lever to said tractor, said other lever extending generally rearwardly of said tractor, pin means pivotally connecting the other end of said other lever to said arm intermediate the ends thereof, means for pivoting said lever assembly to move said arm from a position on the side of and intermediate the ends of the tractor to a position above the forward end of the tractor, a boom having one end thereof pivotally connected to said arm intermediate the ends thereof, the other end of said boom extending forwardly of said tractor, means connected between said boom intermediate the ends thereof and the other end of said arm for pivoting said boom from a downwardly extending position to an upwardly extending position, a bucket pivotally carried on the forward end of said boom, and means for pivoting said bucket relative to said boom.

8. In a tractor loader, a lever assembly comprising a pair of levers and a normally vertically extending arm, one end of one of said levers pivotally connected to the forward end of said tractor and extending generally rearwardly thereof, means pivotally connecting one end of said arm to the other end of said one lever, the other of said levers pivotally connected at one end thereof to the forward end of said tractor at a position spaced below the pivotal connection of said one lever to said tractor, said other lever extending generally rearwardly of said tractor, pin means pivotally connecting the other end of said other lever to said arm intermediate the ends thereof, means for pivoting said lever assembly to move said arm from a position on the side of and intermediate the ends of the tractor to a position above the forward end of said tractor, a boom having one end thereof pivotally connected to said arm intermediate the ends thereof, the other end of said boom extending forwardly of said tractor, a hydraulic ram, means pivotally connecting the rod end of said hydraulic ram to said boom intermediate the ends thereof, means pivotally connecting the head end of said hydraulic ram to the other end of said arm for pivoting said boom from a downwardly extending position to an upwardly extending position, a bucket pivotally carried on the forward end of said boom, and means for pivoting said bucket relative to said boom.

References Cited by the Examiner
UNITED STATES PATENTS

| | | | |
|---|---|---|---|
| 2,449,212 | 9/48 | Fraga | 214—140 |
| 2,820,555 | 1/58 | Lessmann | 214—140 |
| 2,897,987 | 8/59 | Johansson | 214—140 |
| 2,980,271 | 4/61 | Ulinski | 214—140 |
| 3,077,244 | 12/62 | Lull | 214—140 |

HUGO O. SCHULZ, *Primary Examiner.*

MORRIS TEMIN, *Examiner.*